United States Patent [19]

Zacherl

[11] 4,184,720

[45] Jan. 22, 1980

[54] AIR-SUPPORTED BEARING FOR TURBINE ENGINES

[75] Inventor: Anton Zacherl, Münich, Fed. Rep. of Germany

[73] Assignee: MTU Motoren-und Turbinen-Union, Münich, Fed. Rep. of Germany

[21] Appl. No.: 845,789

[22] Filed: Oct. 26, 1977

[30] Foreign Application Priority Data

Oct. 26, 1976 [DE] Fed. Rep. of Germany ....... 2648328

[51] Int. Cl.² ..................... F01D 25/16; F16C 32/06
[52] U.S. Cl. ......................................... 308/9; 308/72; 308/DIG. 1; 308/DIG. 15; 416/241 B
[58] Field of Search ............... 308/9, 72, DIG. 1, 122, 308/DIG. 8, DIG. 15, 5 R, 78, 92, 106, 121, 237 A, 240; 416/241 B; 60/39.36

[56] References Cited

U.S. PATENT DOCUMENTS

| 3,740,163 | 6/1973 | Schinnerer et al. ....... 308/DIG. 1 X |
| 3,754,800 | 8/1973 | Johansson ............................ 308/9 |
| 3,943,703 | 3/1976 | Kronogard .................. 416/241 B X |

*Primary Examiner*—Douglas C. Butler
*Attorney, Agent, or Firm*—Scully, Scott, Murphy & Presser

[57] ABSTRACT

A bearing for the ceramic rotor of a turbine engine or turbomachine, which consists of an air-supported bearing providing for a lubricating air film between the inner and outer bearing rings at least at the higher operating speeds of the engine. This facilitates operation of the turbine engine or machine under high temperature and rotational speed operating conditions.

2 Claims, 2 Drawing Figures

AIR-SUPPORTED BEARING FOR TURBINE ENGINES

BACKGROUND OF THE INVENTION

1. Field of the Invention

The present invention relates to a bearing for a ceramic rotor in a thermal turbine engine or turbomachine and rotating at high rotational speed, with a spherical air-supported bearing which has a lubricating air film maintained between its outer bearing ring and inner bearing ring.

2. Discussion of the Prior Art

In more recent periods a transition has been made to equip with air-supported bearings those turbine engines or turbomachines which run within particularly high temperature ranges, and whose individual components are therefore constructed of ceramic components, particularly in the range of the high temperature zones, since the usual lubrication of bearings by means of oil is only possible up to a maximum bearing temperature range of within about 200° to 300° C., but not at temperatures of 500° and above, as can be present at the bearing locations of the ceramic rotors for such machines. It is presently known that for the bearing support of the rotor shafts for such turbine engines there may be employed spherical bearings which are necessary due to the thermal changes encountered in the housing components during machine operation. In the utilization of spherical air-supported bearings for the described instances of application, there is now encountered the problem that, because of the different thermal expansion of metal housings and ceramic rotors of such turbomachines which operate within a high temperature range (the coefficients of thermal expansion of predetermined ceramics distinguishes from those of the usual housing metals by approximately the tenth power), during the course of operation there occurs an axial displacement between the shaft bearing location, on the one hand, and the housing bearing location, on the other hand. However, a displacement of that extent cannot be absorbed by the spherical air-supported bearings and, as a consequence, leads to the destruction thereof.

SUMMARY OF THE INVENTION

Accordingly, it is an object of the present invention to produce a type of bearing which, on the one hand, permits deflections of the shaft of the ceramic rotor and, on the other hand, allows for considerably different extents of thermal expansions of the ceramic rotors and bearing supports (housings) without being subjected to any damage. In addition to the foregoing, the bearing is simply constructed so as to, in particular, facilitate a simple mounting thereof.

In order to achieve the foregoing objects of the invention, it is inventively proposed that the materials of the inner bearing ring and the shaft of the ceramic rotor be so selected with regard to each other, that the gap between the shaft and the inner bearing ring remains approximately constant over the entire temperature range and rotational speed range of the turbomachine or turbine engine and that the interfitting or mating diameters of said inner bearing ring and said shaft be so correlated with regard to each other that, at lower rotational speeds of the turbomachine, there is produced a frictional contact between the inner bearing ring and the shaft, whereas in contrast therewith, at higher rotational speed a dynamic lubricating air film builds up between the shaft and inner bearing ring.

By means of the inventive embodiment, the sought for objects of the invention are attained in the simplest manner, namely, in that for a rotating turbine engine there is produced practically a dual air-supported bearing between the shaft of the ceramic rotor and the housing, of which the outer bearing is the spherical bearing whereas the inner bearing pertains to a cylindrical air-supported bearing which permits a resistanceless axial displacment of the shaft with regard to the bearing location. At lower rotational speeds which are not sufficiently high to generate a dynamic lubricating air film within a small cylindrical annular gap, the second air-supported bearing is inoperative, and a friction contact is produced between the inner bearing ring and the shaft. Thus, commencing from standstill up to an average rotational speed, the shaft, while taking along the spherical inner bearing ring, runs in the outer bearing ring of the spherical air-supported bearing, so that an air gap can also be maintained intermediate the bearing rings at lower rotational speeds through the infeed of compressed air. As soon as a critical rotational speed is exceeded, the latter of which can be predetermined through a suitable setting of parameters, there is generated a dynamic air gap between the shaft and the cylindrical inner bearing ring bore so that there will also occur relative movement between the shaft and the inner bearing ring, meaning, the shaft itself will run in an air-lubricated manner within the inner bearing ring. In order to maintain the gap constant between the shaft and the inner bearing ring, it must be considered that a temperature dropoff takes place extending from the shaft to the inner bearing ring which must be compensated for by a slightly higher coefficient of thermal expansion for the inner bearing ring than that of the shaft. At each temperature level of the turbine engine the shaft can axially shift with regard to the bearing location or, conversely, the bearing location which is seated in the housing can shift with regard to the rotating shaft.

In a preferred embodiment of the invention, for a radial loading on a bearing location of about 20 kp, and at a rated rotational speed of 50,000 rpm, there should be maintained the following parameters:

| | |
|---|---|
| Normal diameter of the shaft | 50 mm |
| Width of the inner bearing ring | 50 mm |
| Average roughness of shaft and inner bearing ring | $R_a = 0.2$–$0.3$ |
| Coefficients of thermal expansion of the shaft | $\alpha_s = 4.2 \cdot 10^{-6} \frac{1}{\text{degree}}$ |
| Coefficients of thermal expansion of the inner bearing ring | $\alpha_I = 4.5 \cdot 10^{-6} \frac{1}{\text{degree}}$ |
| Coefficients of thermal expansion of the outer bearing ring | $\alpha_o = 4.8 \cdot 10^{-6} \frac{1}{\text{degree}}$ |
| Difference in diameter between shaft and inner bearing ring and between inner bearing ring and outer bearing ring | $\Delta d = 0.04$–$0.06$ mm |

Indications have shown that for such a setting of the bearing parameters the inner bearing ring will rotate at about 10,000 rpm at the rated speed of the shaft ($n_2 = 50,000$). The exact difference in the rotational speeds and the formation of a dynamic lubricating film between the inner ring and the shaft depends upon the load and the rotational speed of the shaft.

BRIEF DESCRIPTION OF THE DRAWINGS

Reference may now be had to the following detailed description of a preferred embodiment of the invention, taken in conjunction with the accompanying drawings; in which.

DETAILED DESCRIPTION

Figure 1:
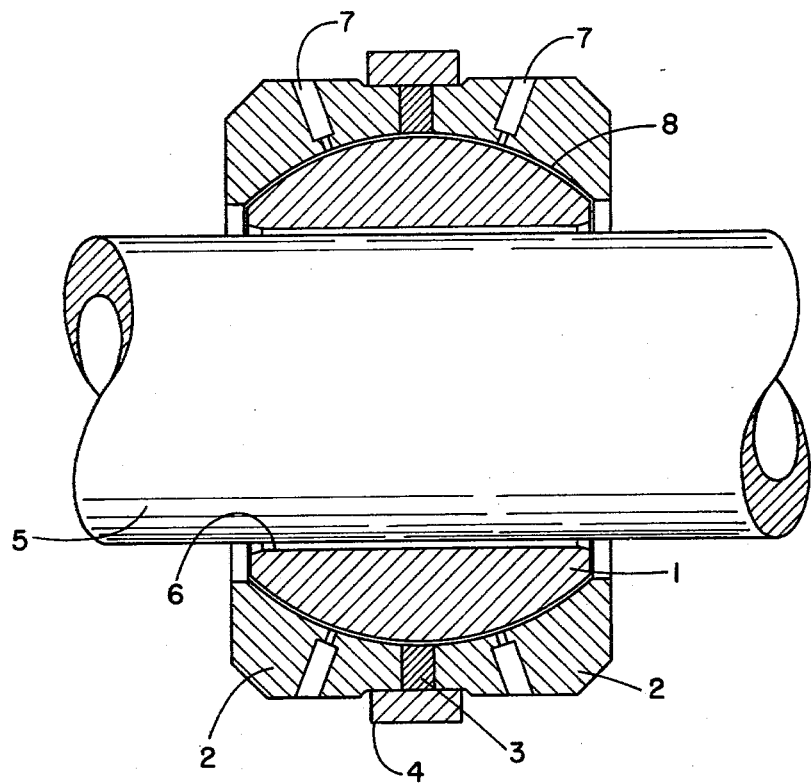
FIG. 1 illustrates an axial sectional view through a bearing constructed pursuant to the present invention.

Referring in detail to the drawing, and particularly FIG. 1, a ceramic shaft 5 is received within the cylindrical bore of an inner bearing ring 1 whose outer surface is formed as a spherical bearing surface. An air gap 8 exists between the spherical bearing surface of the inner bearing ring 1 and a therewith associated spherical bearing surface which is constituted of an outer bearing ring formed from two half shells 2, and with the air gap being maintained through the introduction of compressed air through inlet bores 7 provided in the outer bearing ring even at low rotational speeds of the inner bearing ring 1. The two bearing shells 2 should be axially braced in a housing (not shown) through the utilization of a required finishing interlining 3. An air gap 6 should exist between a shaft 5 and the bore of the inner bearing ring 1, which will permit a resistanceless axial shift or displacement between the shaft 5 and the inner bearing ring 1 and allow for the formation of an aerodynamic lubricating film at high rotational speeds.

Figure 2:
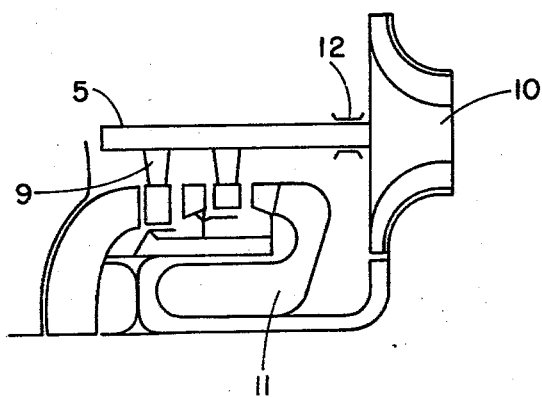
FIG. 2 is a diagrammatic representation, on a reduced scale, of a gas turbine incorporating the inventive bearing.

Schematically illustrated in section in FIG. 2 of the drawings is a gas turbine incorporating an inventive bearing. Seated on a main shaft 5 is a radial turbine rotor 10, as well as an axial rotor 9. The shaft 5, together with the rotors 9 and 10, is constituted of an integrally constructed ceramic component. However, it is possible that the axial rotors 9 are detachably fastened on the shaft 5. In the region of the radial turbine rotor 10, the ceramic shaft is supported in a spherical air-supported bearing constructed in accordance with the embodiment illustrated in FIG. 1 of the drawings. The housing for this air-supported bearing is identified by reference numeral 12, and the combustion chamber of the gas turbine is identified by reference numeral 11.

What is claimed is:

1. In a thermal turbine engine having a ceramic rotor, having a cylindrical shaft, adapted to rotate at high rotational speeds, a bearing comprising an air-supported bearing, said air-supported bearing including an outer bearing ring and an inner bearing ring, and a lubricating air film being maintained intermediate said bearing rings, the improvement comprising: said inner bearing ring including a convex spherical outer surface and said outer bearing ring including a concave inner spherical surface substantially complementary to and positioned adjacent said convex outer spherical surface with a spherical fluid gap existing between the convex and concave surfaces, said inner bearing ring also including a cylindrical inner surface substantially complementary to and positioned adjacent to the outer cylindrical surface of said cylindrical shaft with a cylindrical gap existing therebetween, and the materials of said inner bearing ring and the shaft of said ceramic rotor being selected so that the cylindrical gap between said shaft and said inner bearing ring remains substantially constant over the entire temperature range and rotational speed range of said turbine engine, and the diameters of said shaft and said inner bearing ring being dimensioned relative to each other so that a friction contact exists between said inner bearing ring and said shaft at lower rotational speeds of said engine whereas a dynamic lubricating air film is produced intermediate said shaft and said inner bearing ring at higher rotational speeds.

2. The bearing as claimed in claim 1, said bearing operating under a radial load of about 20 kp and a rated rotational speed of 50,000 rpm at a temperature of about 500° C., said bearing further comprising the parameters of:

| | |
|---|---|
| Normal diameter of the shaft | 50 mm |
| Width of the inner bearing ring | 50 mm |
| Average roughness of shaft and inner bearing ring | $R_a = 0.2$–$0.3$ |
| Coefficients of thermal expansion of the shaft | $\alpha_S = 4.2 \cdot 10^{-6} \frac{1}{\text{degree}}$ |
| Coefficients of thermal expansion of the inner bearing ring | $\alpha_I = 4.5 \cdot 10^{-6} \frac{1}{\text{degree}}$ |
| Coefficients of thermal expansion of the outer bearing ring | $\alpha_o = 4.8 \cdot 10^{-6} \frac{1}{\text{degree}}$ |
| Difference in diameter between shaft and inner bearing ring and between inner bearing ring and outer bearing ring | $\Delta d = 0.04$–$0.06$ mm |

* * * * *